(12) United States Patent
Moore et al.

(10) Patent No.: US 6,386,764 B1
(45) Date of Patent: May 14, 2002

(54) BEARING UNITIZED FOR HANDLING

(75) Inventors: W. Norman Moore; Thomas J. Rybkoski, both of Uniontown, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 09/656,569

(22) Filed: Sep. 7, 2000

(51) Int. Cl.$^7$ .................... F16C 41/04; F16C 33/46
(52) U.S. Cl. ............. 384/448; 384/523; 384/560; 384/585
(58) Field of Search .................... 384/448, 523, 384/537, 539, 571, 559, 560, 561, 584, 585

(56) References Cited

U.S. PATENT DOCUMENTS

| | | | |
|---|---|---|---|
| 2,166,377 A | * 7/1939 | Scribner | 384/571 |
| 3,397,021 A | * 8/1968 | Fitzsimmons | 384/585 |
| 3,734,579 A | * 5/1973 | Schumacher | 384/584 |
| 4,136,916 A | 1/1979 | Musselman et al. | 384/560 |
| 4,699,529 A | * 10/1987 | Scholl et al. | 384/560 |
| 5,102,242 A | * 4/1992 | Hussblein et al. | 384/523 |
| 5,129,495 A | * 7/1992 | Johnston et al. | 384/560 X |
| 5,308,171 A | 5/1994 | Sakamoto | 384/448 |
| 5,527,114 A | 6/1996 | Morita | 384/448 |
| 5,735,612 A | 4/1998 | Fox et al. | 384/448 |
| 6,179,473 B1 | * 1/2001 | Ponson et al. | 384/537 |

FOREIGN PATENT DOCUMENTS

DE 3902937 A1 * 8/1990 .............. 384/523

OTHER PUBLICATIONS

TIMKEN Unit–Bearing maintenance manual, pp. 1–12, prior to 1999.
FAG, Ballard Roller Bearing Engineering, p. 15, 1977.

* cited by examiner

Primary Examiner—Thomas R. Hannon
(74) Attorney, Agent, or Firm—Polster, Lieder, Woodruff & Lucchesi, L.C.

(57) ABSTRACT

A single row tapered roller bearing enables an axle shaft to rotate in an axle housing and further confines the shaft axially with respect to the housing. The bearing includes a cup that is fitted into the housing and a cone that is fitted around a bearing seat on the shaft and also tapered rollers located between raceways on the cup and cone. Radial loads and thrust loads in one axial direction are transferred to the rollers at the raceways. Thrust loads in the other axial direction are transferred to the rollers at a confining surface on the cup at the large ends of the rollers and at another confining surface on a backing collar located at the small ends of the rollers. The backing collar fits over the bearing seat on the shaft with an interference fit and captures the cone on the bearing seat. The bearing also has a cage provided with pockets which receive the rollers, and the cage at its small ends has tabs which project behind a rib on the backing collar and interlock the cage and the collar, so that prior to installation on the shaft the backing collar remains with the cup, cone and rollers. The cup carries a speed sensor which monitors rotation of an excitor ring on the cone.

20 Claims, 3 Drawing Sheets

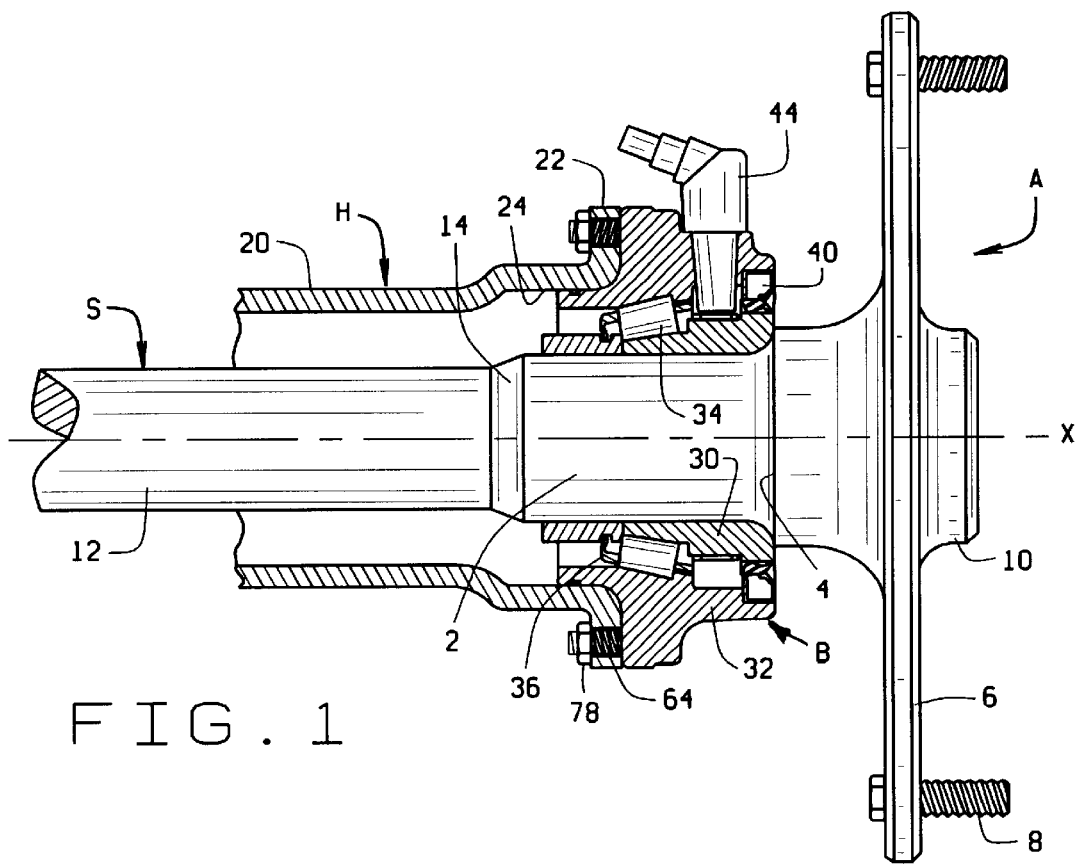
FIG. 1
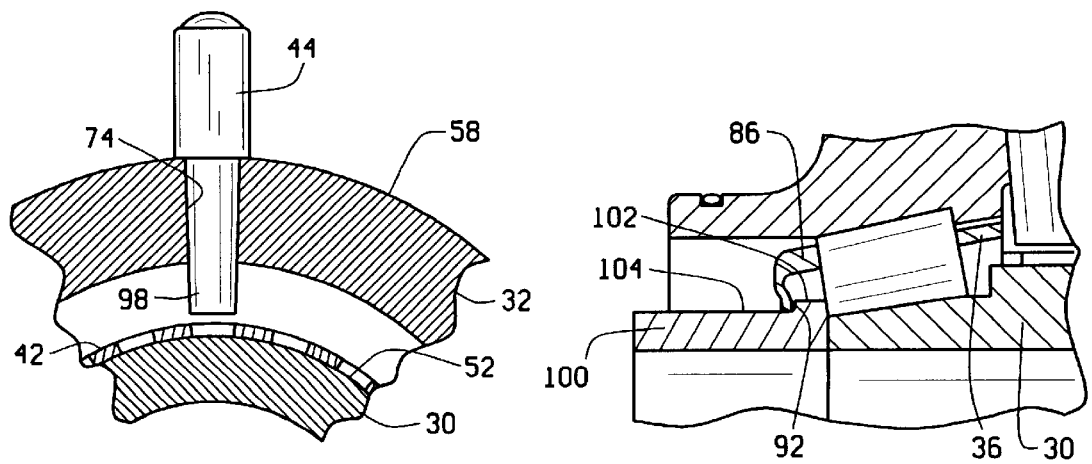
FIG. 5
FIG. 7

BEARING UNITIZED FOR HANDLING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates in general to antifriction bearings and, more particularly, to such a bearing that is unitized for handling.

Some automotive vehicles of current design, particularly light trucks, sport utility vehicles, and even some large sedans, have solid rear axles on which the road wheels which actually drive such vehicles rotate. The typical solid axle actually has tube-like axle housings which are clamped to the suspension system of the vehicle and axle shafts which rotate in the housings. At their outboard ends the axle shafts have flanges to which the road wheels are attached. The two shafts rotate in antifriction bearings that are fitted to the ends of the axle housings.

One bearing that has performed quite well and has seen widespread use in axles of automotive vehicles has a single row of tapered rollers located between ribs—one on the outer race or cup and the other one on the inner race or cone. The bearing, while accommodating radial loads, also takes thrust loads in both axial directions. Thrust loads develop while a vehicle negotiates turns, and the bearings are configured so that the heaviest thrust loads are transferred through the raceways, while lighter thrust loads are transferred through the ribs.

A single row tapered roller bearing suitable for use on a solid automotive axle contains a variety of components, and some of these components have been unitized to facilitate assembly of the axle. For example, on one type of single row bearings the cone, the cup and the rollers are all held together by a rib ring that is fitted to the cup and secured temporarily with an adhesive. But other components remain, and they require separate attention and handling during the assembly of the axle. These other components often taken the form of a seal for keeping lubricant in the bearing and contaminants out of it, a speed sensor, a backing collar for holding the bearing on the axle shaft, and a clamping ring for keeping the bearing in the axle housing. However, automotive manufacturers prefer components arranged in assembled packages, and the greater the number of components that can be incorporated into a package, the easier the assembly of the automobile becomes.

SUMMARY OF THE INVENTION

An antifriction bearing has rolling elements arranged in a row between inner and outer races where they roll along raceways, and are confined within a cage which maintains the proper separation between them. The inner race is aligned with a backing collar which is interlocked with the cage for handling.

DESCRIPTION OF THE DRAWINGS

FIG. 1 is a sectional view of the end of an axle fitted with a single row tapered roller bearing constructed in accordance with and embodying the present invention;

FIG. 5 is a fragementary sectional view of the bearing taken along line 5—5 of FIG. 2;

FIG. 7 is a fragmentary sectional view of the bearing provided with a modified backing collar.

DETAILED DESCRIPTION

Figure 2:
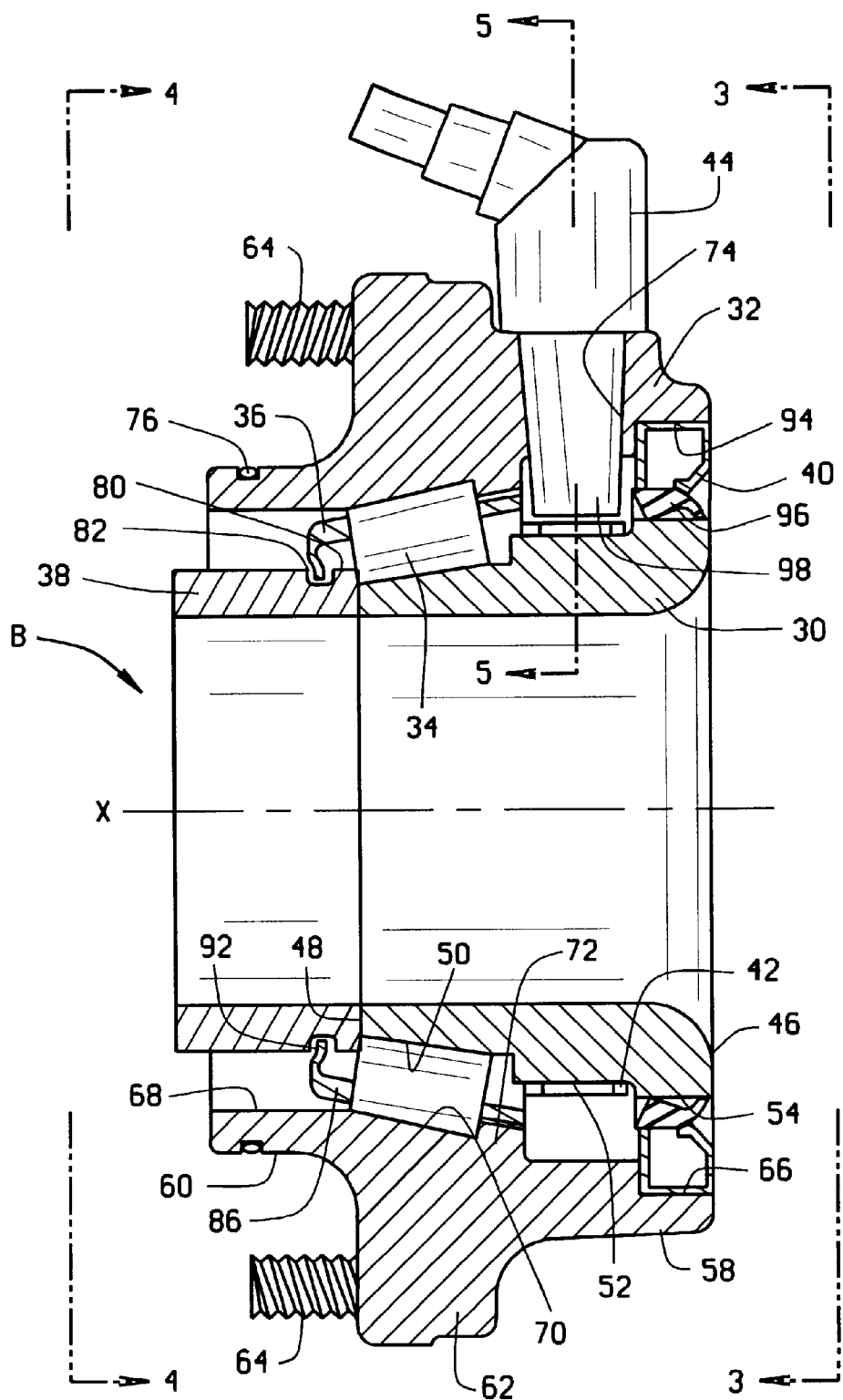
FIG. 2 is an enlarged sectionnal view of the bearing.
Figure 3:
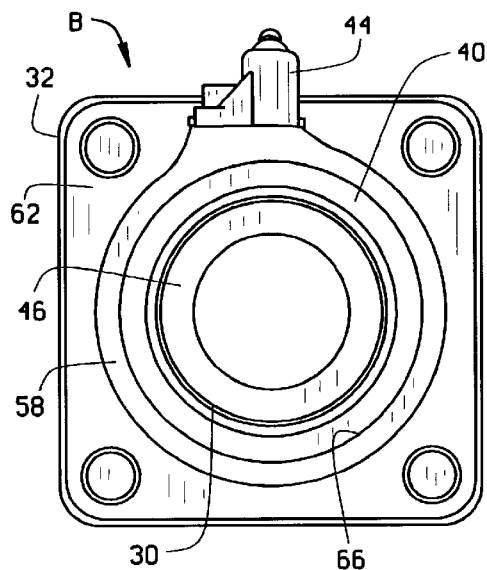
FIG. 3 is an elevational view of the bearing taken along line 3—3 of FIG. 2 and showing the outboard end of the bearing.
Figure 4:
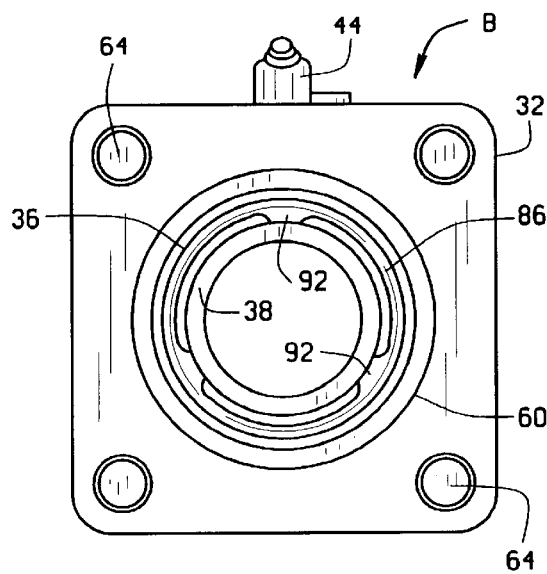
FIG. 4 is an elevational view of the bearing taken along line 4—4 of FIG. 2 and showing the inboard end of the bearing.

Referring now to the drawings, a solid axle A (FIG. 1) for an automotive vehicle includes an axle housing H, an axle shaft S, and a bearing B which enables the axle A to rotate in the housing H about an axis X. Since the axle shaft S is confined within the housing H by the bearing B, the axle A is of the semi-floating variety. The bearing B comes as a package, preset and lubricated for initial operation. Moreover, the bearing B is unitized for handling and is installed over the axle A and within the housing H in its fully unitized condition.

Considering the axle shaft S first, it has (FIG. 1) a bearing seat 2 of cylindrical configuration and a shoulder 4 to which the seat 2 leads. Beyond the shoulder 4 the shaft S has a flange 6 which accommodates fasteners 8 that may take the form of threaded studs that project from the flange 6 or cap screws which thread into the flange 6. The fasteners 8 are arranged in a circle around the axis X and around a wheel pilot 10 which is actually a cylindrical boss that projects from the flange 6. A brake drum or disk (not shown) fits against the flange 6, while a road wheel (not shown) fits against the drum or disk, it being centered by the wheel pilot 10. The fasteners 8 hold the drum or disk and the wheel against the flange 6. On its opposite side, the bearing seat 2 opens onto an extended portion 12 of the shaft S at a beveled transition 14, with the extended portion 12 having a diameter less than that of the seat 2.

The housing H has (FIG. 1) a tubular body 20 and an outwardly directed flange 22 at the end of the body 20. The interior of the body 20 opens out of the flange 22 at a cylindrical end bore 24.

The bearing B fits over the cylindrical bearing seat 2 on the axle shaft S and within the end bore 24 of the axle housing H, it being secured to both the shaft S and the housing H. The bearing B enables the shaft S to rotate in the housing H about the axis X, yet confines the shaft S axially, so that it cannot move further into or out of the housing H. The bearing B includes (FIG. 2) an inner race in the form of a cone 30, an outer race in the form of a cup 32 that encircles the cone 30, rolling elements in the form of tapered rollers 34 organized in a single row between the cone 30 and cup 32, a cage 36 likewise located between the cone 30 and cup 32 where it separates the rollers 34, a backing ring 38 against the inboard end of the cone 30, a seal 40 between the cone 30 and cup 32 at their outboard ends, an excitor ring 42 around the cone 30, and a speed sensor 44 fitted to the cup 32 where it monitors the rotation of excitor ring 42 on the cone 30.

Turning now to the cone 30, it fits over the bearing seat 2 with an interference fit and at one end has (FIG. 2) a back face 46 which is squared off with respect to the axis X. The back face 46 bears against the shoulder 4 at the end of the bearing seat 2. At its opposite end, the cone 30 has a front face 48 which is likewise squared off with respect to the axis X. Between its front face 48 and back face 46, the cone 30 has a tapered raceway 50, a ring seat 52, and a cylindrical sealing surface 54. The tapered raceway 50 runs out to the front face 48 and has its smallest diameter at the front face 48. The sealing surface 54 runs out to the back face 46. The ring seat 52 lies between the raceway 50 and the sealing surface 52, its diameter being greater than that of the large end of the raceway 50, but less than that of the sealing surface 52.

The cup 32 surrounds the cone 30 and has (FIG. 2) two generally cylindrical end portions 58 and 60, with the portion 58 being at the outboard end of the bearing B and the portion 60 at the inboard end. The outboard end portion 58 has the greater diameter, and it lies around both the ring seat 52 and the sealing surface 54 on the cone 30. Between the two end portions 58 and 60, the cup 32 has a flange 62. Within its outboard end portion 58 the cup 32 has a large end bore 66, while the inboard end portion 60 contains a small end bore 68. The sealing surface 54 of the cone 30 lies within the large end bore 66, while the backing collar 38 lies within the small end bore 68. At its inner end, the small end bore 68 opens into the small end of a tapered raceway 70 that surrounds the tapered raceway 50 of the cone 30. The cup raceway 70 runs out to an internal rib 72 which projects inwardly toward the cone 30. Between the rib 72 and the large end bore 66 the outboard end portion 58 of the cup 32 has a radial bore 74 which opens toward the ring seat 52 on the cone 30 and receives the speed sensor 44. Finally, the inboard end portion 60 contains an O-ring seal 76. The inboard end portion 60 fits into the bore 24 of the axle housing H, enabling O-ring seal 76 to establish a fluid barrier with the surface of the bore 24 in the housing H. The flange 62 on the cup 32 is clamped firmly against the flange 22 on the housing H by fasteners 78 which may take the form of threaded studs that project from the flange 62 through the flange 22 beyond which they engage with nuts, or vice versa, or cap screws extended through the flange 22 and threaded into the flange 62.

The tapered rollers 34 are organized in a circular row between the cone 30 and cup 32 at the raceways 50 and 70, there being generally line contact between the side faces of the rollers 34 and the raceways 50 and 74 (FIG. 2). The large end faces of the rollers 34 bear against the internal rib 72 at the large end of the cup raceway 70, and indeed, the rib 72 provides a confining surface which prevents the rollers 34 from moving up the raceways 50 and 70. The small end faces of the rollers 34 lie along the edge formed by the intersection of the small end of the cone raceway 50 and the cone front face 48, but do not project beyond that edge. The rollers 34 are on apex, meaning that the conical envelopes in which their tapered side faces lie have their apices at a common point along the axis X, and the conical envelopes for the raceways 50 and 70 have their apices at the same point as well.

Figure 6:
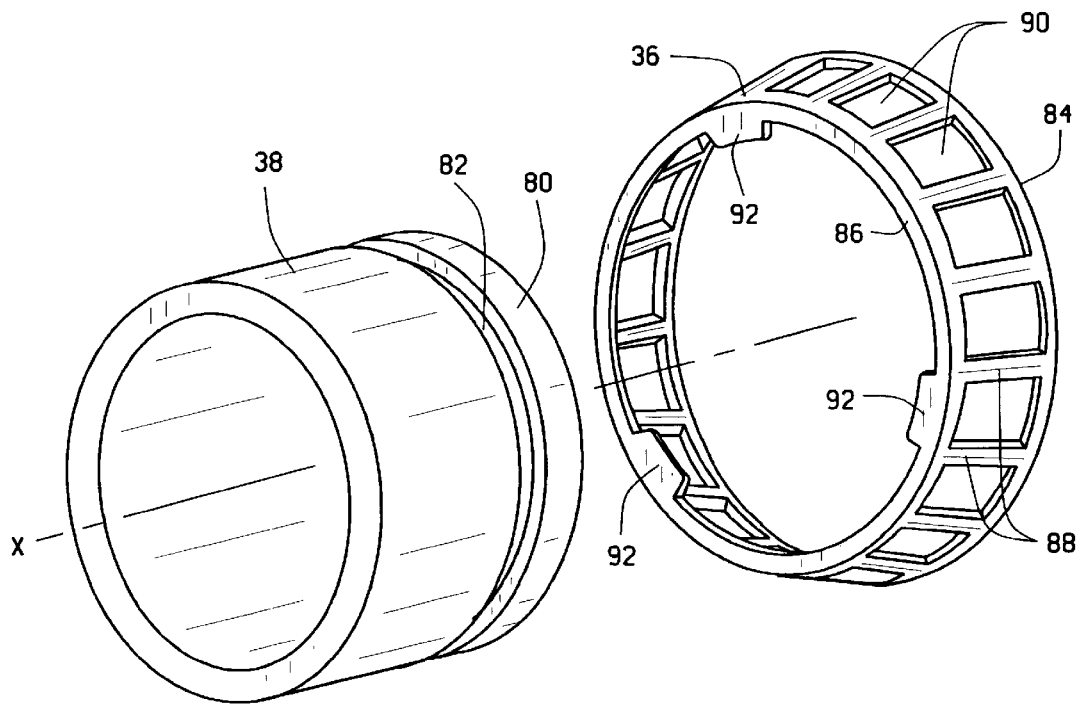
FIG. 6 is an exploded perspective view showing the cage and backing collar of the bearing.

The backing collar 38 also fits over the bearing seat 2 (FIG. 2) with an interference fit, and the friction of that fit serves to secure both the collar 38 and the cone 30 on the axle shaft S. One end of the backing collar 38 abuts the front face 48 of the cone 30 and here the backing collar 38 projects outwardly beyond the small end of the cone raceway 50 to form a rib 80 that provides another confining surface that is presented toward the small end faces of the rollers 34. While the rollers 34 are captured between the two ribs 72 and 80, they are not compressed between the ribs 72 and 80. Instead, a slight internal clearance exists between the ribs 72 and 80, on one hand, and the rollers 34, on the other. Behind the rib 80, the backing collar 38 contains an annular groove 82 (FIGS. 2 & 6) which opens radially outwardly into the small end bore 68 of the cup 32. One of the side walls of the groove provides a shoulder which is presented away from the small ends of the rollers 34.

The cage 36 has (FIGS. 2 & 6) a large end ring 84 that extends across the large end faces of the rollers 34 and a small end ring 86 that extends across the small end faces for the rollers 34, as well as bridges 88 which extend between the end rings 84 and 86, thus creating pockets 90 in which the rollers 34 are received. The large end ring 84 revolves in close proximity to the cup rib 72 and indeed the inside face of the cup rib 72 is beveled to conform to the inclination of the end ring 84. The bridges 88 lie beyond the centerlines of the individual rollers 34, and their side faces are beveled to conform somewhat to the curvature of the tapered side faces. As a consequence, the cage 36 rides or floats upon the row of rollers 34 beyond the envelope formed by the centerlines of the rollers 34. The small end ring 86 projects over the rib 80 on the backing collar 38 and is provided with tabs 92 which are directed inwardly into the groove 82 of the collar 38. The tabs 92 do not actually contact the surfaces of the groove 82 when the bearing B is in operation, but do serve to hold the backing collar 38 at the end of the cone 30 when the bearing B is separated from the axle housing H and shaft S. At its small end ring 86 the cage 36 possesses sufficient resiliency to expand enough to allow the tabs 92 to pass over the collar 38 and snap into the groove 82. Preferably, the cage 36 is molded from a polymer.

The seal 40 occupies the large end bore 66 of the cup 32. It includes (FIG. 2) a stamped metal case 94 that is pressed into the bore 66 and an elastomeric seal element 96 which establishes dynamic fluid barrier along sealing surface 54 of the cone 30.

The speed sensor 44 fits into the radial bore 74 of the cup 32 and has (FIGS. 2 & 5) a head 98 which projects into the annular space between the cone 30 and cup 32. Actually, the head 98 is presented toward the exciter ring 42 which is pressed over the ring seat 52 on the cone 30. The ring 42 possesses axially directed bars which form discontinuities, and these discontinuities have the capacity to disrupt a magnetic field produced by the sensor 44. As the cone 30 rotates the sensor 44 produces an electrical signal that reflects the annular velocity of the cone 30.

The bearing B is furnished as a preassembled package, with the seal 40, the sensor 44, and the backing collar 38 forming part of the package. The seal 40 embraces the sealing surface 54 on the cone 30 and prevents the cone 30 from moving axially out of the outboard end of the cup 32. The cage 36, with its tabs 92 interlocked with the backing collar 38 at the groove 82 in the collar 38, holds the collar 38 at the inboard end of the cone 30, and the collar 38 in turn prevents the tapered rollers 34 from moving down the cup raceways 70 and out of the inboard end of the space between the cone 30 and cup 32.

To assemble the axle A, the bearing B is advanced over the axle shaft S with the extended portion 12 of the shaft S initially received in the cone 30 and in the backing collar 38 of the packaged bearing B and with the back face 46 of the cone 30 leading. When the cone 30 encounters the beveled transition 14 between the extended portion 12 and the bearing seat 2, an axially directed force is applied to the backing collar 38. Its magnitude is great enough to drive both the cone 30 and the collar 38 over the cone seat 2. The force, which may be applied through a tube fitted over the extended portion 12 of the axle shaft S, drives the cone 30 all the way to the shoulder 4 at the end of the axle shaft S. The back face 46 of the cone 30 abuts the shoulder 4, while the end of the collar 38 abuts the front face 48 of the cone 30. Thus, the cone 30 is captured between the shoulder 4 and the backing collar 38.

Once the bearing B is installed over the axle shaft S, the bearing B and axle shaft S are fitted to the axle housing H. To this end, the inboard end portion 60 of the cup 32 is aligned with the bore 24 in the end of the axle housing H, and the cup 32 is advanced into that bore 24. When the flange 62 of the cup 32 comes against the flange 22 at the end of the axle housing H, they are clamped together with the fasteners 78, thus securing the cup 32 firmly on the housing H.

In operation, the axle shaft S rotates within the housing H which remains fixed against rotation. The tapered rollers 34 roll along the raceways 50 and 70 of the cone 30 and cup 32, respectively, and transfer radial loads—in essence, the weight of the vehicle chassis and contents—from the cup 32 to the cone 30, all with minimal resistance to the rotation of the axle shaft S. The radial load urges the rollers 34 up the raceways 50 and 70, but the internal thrust rib 72 at the large end of the cup raceway 70 keeps the rollers 34 in the proper axial position with respect to the raceways 50 and 70. A thrust load, which urges the axle shaft S into the housing H, is likewise resisted at the raceways 50 and 70, that is to say, the load is transferred from the cup 32 to the cone 30 transversely through the rollers 34. On the other hand, a thrust load in the opposite direction, that is one that urges the flange 6 of the shaft S away from the flange 22 of the housing H, is transferred generally longitudinally through the rollers 34 from the internal rib 72 on the cup 32 to the rib 80 on the backing collar 38. Thus, the two ribs 72 and 80 provide confining surfaces between which the rollers 34 are located.

A modified backing collar 100 (FIG. 7) has a rib 102 that projects outwardly from a cylindrical external surface 104. The rib 102 lies at one end of the collar 100 where it provides a confining surface that is presented toward the small end faces of the rollers 34. The cylindrical surface 104, which is of lesser diameter than the rib 102 extends from the rib 102 to the opposite end of the collar 100. Thus the rib 102 also provides a shoulder that is presented away from the rollers 34.

The small end ring 86 on the cage 36 encircles the rib 102 of the collar 100, and the tabs 92 on the cage 36 project inwardly behind the shoulder 106 of the rib 102. In that sense they interlock the cage 36 with the collar 100 so that the two do not separate. Moreover, the inner margins of the tabs 92 may bear against the cylindrical surface 104 of the collar 100, so that a slight interference fit exists between the tabs 92 and the surface 104. This serves to better align the bore of the collar 100 with the bore of the cone 30 during the installation of the bearing B on the bearing seat 2 of the axle shaft S. However, when an interference fit exists, the cage 36, or at least the tabs 92 on the cage 36, should be formed from a material that is softer than the steel of the collar 100, a polymer for example. The bearing B with the modified collar 100 is assembled and installed on the axle seat 2 in the same manner as the bearing B having the collar 38.

When the bearing B with its modified collar 100 is initially set into operation, the tabs 92 of the cage 36 rub against the cylindrical surface 104 of the collar 100. Since the cage 36 is formed from a polymer, the tabs 92 along their inner margins wear away and in time a loose fit develops between the tabs 92 and the cylindrical surface 104.

The concept of a cage interlocked with a backing collar may be used to maintain a backing collar aligned with the inner race of another type of bearing, such as the inner race for an angular contact ball bearing, the inner race for a radial ball bearing, the inner race for a spherical roller bearing, or the inner race for a cylindrical roller bearing.

What is claimed is:

1. An antifriction bearing for facilitating rotation about an axis, said bearing comprising: an inner race having a raceway that is presented outwardly away from the axis; an outer race surrounding the inner race and having a raceway that is presented inwardly toward the raceway of the inner race; rolling elements arranged in a circular row between the inner and outer raceways and conforming generally to the raceways; a backing collar located at one end of the inner race; and a cage located between the raceways and having pockets which receive the rolling elements, the cage being engaged with the backing collar such that the backing collar is confined axially with respect to the cage and the rolling elements.

2. A bearing according to claim 1 wherein the raceways are inclined with each having a large end and a small end; and wherein the configuration and inclination of the raceways is such that radial loads and thrust loads are transferred to the rolling elements at the raceways.

3. A bearing according to claim 2 and further comprising a first confining surface at the large end of one of the raceways and a second confining surface at the small end of the other raceway; and wherein thrust loads in one direction are transferred to the rolling elements at the raceways and thrust loads in the other direction are transferred to the rolling element through the confining surfaces.

4. A bearing according to claim 3 wherein the first confining surface is located at the small end of the raceway on the inner race and the second confining surface is located at the large end of the raceway on the outer race.

5. A bearing according to claim 4 wherein the first confining surface is on the backing collar and the second confining surface is on the outer race.

6. A bearing according to claim 1 wherein the backing collar has a shoulder which is presented away from the rolling elements; and wherein the cage has elements which are directed inwardly behind the shoulder on the backing collar.

7. A bearing according to claim 6 wherein an interference fit exists between the inwardly directed elements of the cage and the collar behind the shoulder on the collar.

8. An antifriction bearing for facilitating rotation about an axis, said bearing comprising: a cone having a tapered raceway that is presented outwardly away from the axis; a cup surrounding the cone and having a tapered raceway that is presented inwardly toward the raceway of the cone and also a thrust rib provided with a confining surface located at the large end of its raceway; tapered rollers arranged in a single row between the cone and the cup and contacting the raceways along their tapered side faces and the confining surface at their large ends; a cage having end rings extended across the large and small ends of the rollers and bridges extended between the end rings, all to define pockets which receive the rollers; another confining surface at the small ends of the tapered rollers; a backing collar at the end of the cone at which the other confining surface is located and being engaged with the cage so that the backing collar is retained at the end of the cone.

9. A bearing according to claim 8 wherein the other confining surface is on the backing collar.

10. A bearing according to claim 8 wherein the backing collar has a shoulder which is presented away from the small ends of the rollers, and the cage on its small end ring has tabs which project behind the shoulder on the backing collar, whereby the cage is interlocked with the backing collar.

11. A bearing according to claim 10 wherein the cup has a bore which is located beyond the thrust rib; wherein a seal is located in the bore and contacts the cone to establish a dynamic fluid barrier with the cone; and wherein the friction between the seal and cone retains the cone within the cup.

12. A bearing according to claim 10 wherein the shoulder is along a rib at one end of the collar.

13. A bearing according to claim 10 wherein the shoulder forms one side of a groove that opens out of the collar, and the tabs project into the groove.

14. A bearing according to claim 10 wherein an interference fit exists between the tabs and the collar.

15. In combination with an axle housing and with an axle shaft located within the axle housing and having a flange located beyond the end of the housing, a shoulder behind its flange, and a bearing seat leading up to the shoulder; a single row tapered roller bearing located between the housing and around the shaft for enabling the shaft to rotate in the housing about an axis of rotation and for confining the shaft axially in the housing, said bearing comprising: a cup secured to the axle housing and having a tapered raceway that is presented inwardly toward the axis and a confining surface at the large end of the raceway; a cone located around the bearing seat on the axle shaft and against the shoulder on the shaft, the cone having a tapered raceway that is presented outwardly toward the raceway on the cup; tapered rollers organized in a single row between the cup and cone and having their tapered side faces against the raceways and their large ends against the confining surface on the cup; a cage located between the raceways and having pockets which receive the tapered rollers; and a backing collar fitted over the bearing seat with an interference fit such that the cone is captured between the shoulder of the axle shaft and the backing collar, the backing collar having another confining surface located opposite the small ends of the tapered rollers, the backing collar being interlocked with the cage such that the collar cannot be displaced axially with respect to the cage and rollers, but the cage can rotate relative to the collar.

16. The combination according to claim 15 wherein the collar has a rib at one end and the confining surface is on the rib, and the cage has an end ring, located opposite the small ends of the rollers and tabs on the ring, with the tabs projecting inwardly behind the rib.

17. The combination according to claim 16 and further comprising a seal attached to the cup and fitted around the cone to establish a dynamic fluid barrier around the cone and holding the cone within the cup when the bearing is detached from the shaft and housing.

18. The combination according to claim 16 wherein the collar has a groove which opens outwardly behind the rib, and the tabs on the cage project into the groove.

19. The combination according to claim 16 wherein an interference fit exists between the tabs on the cage and the collar behind the rib.

20. The combination according to claim 16 and further comprising an excitor ring on the cone beyond the large end of the raceway on the cone, and a speed sensor on the cup and having an end presented toward the excitor ring for monitoring the angular velocity of the cone and the axle shaft.

\* \* \* \* \*

UNITED STATES PATENT AND TRADEMARK OFFICE
Certificate

Patent No. 6,386,764 B1　　　　　　　　　　　　　　　　　　　　　　　　Patented: May 14, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: W. Norman Moore, Uniontown, OH; Thomas J. Rybkoski, Uniontown, OH; Byron G. Roubanes, Stone Creek, OH; and Brian J. Werner, Louisville, OH.

Signed and Sealed this Twenty-sixth Day of August 2003.

DAVID A. BUCCI
　　　　　　　　　　　　　　　　　　　　　　　　　　　　　　　　*Supervisory Patent Examiner*
　　　　　　　　　　　　　　　　　　　　　　　　　　　　　　　　　　　Art Unit 3682